United States Patent
Jolani

(10) Patent No.: US 12,270,430 B2
(45) Date of Patent: Apr. 8, 2025

(54) LAYERED MULTI-BODY SUPPORT STRUCTURE

(71) Applicant: MJ Engineering LLC, Shiloh, IL (US)

(72) Inventor: Mahmoud Jolani, Shiloh, IL (US)

(73) Assignee: MJ ENGINEERING LLC, Shiloh, IL (US)

( * ) Notice: Subject to any disclaimer, the term of this patent is extended or adjusted under 35 U.S.C. 154(b) by 208 days.

(21) Appl. No.: 17/825,625

(22) Filed: May 26, 2022

(65) Prior Publication Data
US 2022/0282747 A1    Sep. 8, 2022

Related U.S. Application Data

(63) Continuation-in-part of application No. 16/653,056, filed on Oct. 15, 2019, now Pat. No. 11,346,122.

(51) Int. Cl.
*F16B 7/10* (2006.01)

(52) U.S. Cl.
CPC ..................... *F16B 7/10* (2013.01)

(58) Field of Classification Search
CPC ....... E04H 12/18; E04H 12/182; E04H 12/32; E04C 3/005; E04C 3/28; E04C 3/30; F16B 7/10
USPC ............................. 52/110, 632, 834
See application file for complete search history.

(56) References Cited

U.S. PATENT DOCUMENTS

| | | | | |
|---|---|---|---|---|
| 5,158,103 A | * | 10/1992 | Leu | E01F 9/623 135/88.06 |
| D357,988 S | * | 5/1995 | Sosa | D25/126 |
| 5,454,202 A | * | 10/1995 | van der Weijden | G09F 17/00 70/57 |
| 6,685,154 B1 | * | 2/2004 | Blyth | E01F 9/696 248/512 |
| 7,243,473 B2 | * | 7/2007 | Terrels | E04C 3/32 52/843 |
| 8,322,105 B2 | * | 12/2012 | Williams | E04C 3/36 52/852 |
| 9,702,162 B2 | | 7/2017 | Ceko | |
| 10,113,573 B2 | * | 10/2018 | Kemp | E04H 12/182 |
| 2002/0050112 A1 | * | 5/2002 | Koch | F16C 33/3856 52/651.07 |
| 2010/0064630 A1 | * | 3/2010 | Williams | E04C 3/36 52/834 |

(Continued)

FOREIGN PATENT DOCUMENTS

| | | | |
|---|---|---|---|
| CN | 107882408 A | * 4/2018 | |
| FR | 2860855 A1 | * 4/2005 | ........... E04H 12/182 |

(Continued)

*Primary Examiner* — Ryan D Kwiecinski

(74) *Attorney, Agent, or Firm* — Sandberg Phoenix & von Gontard, P.C.

(57) ABSTRACT

A layered multi-body support structure that comprises a plurality of elongated bodies concentrically disposed within each other. The plurality of elongated bodies comprising an innermost elongated body, an outermost elongated body and at least one intermediate elongated body disposed therebetween. Each elongated body has a proximal end, a distal and a respective length that is different that the lengths of all the other elongated bodies, and wherein the length of at least one of the at least one intermediate elongated bodies and/or the outermost elongated body is longer than the innermost elongated body.

14 Claims, 10 Drawing Sheets

(56) References Cited

U.S. PATENT DOCUMENTS

| | | | |
|---|---|---|---|
| 2013/0084433 A1* | 4/2013 | Ernst | E04F 13/0736 |
| | | | 264/166 |
| 2013/0186039 A1 | 7/2013 | Ceko | |
| 2013/0239490 A1* | 9/2013 | Peng | H01Q 1/1235 |
| | | | 52/111 |

FOREIGN PATENT DOCUMENTS

| | | | | |
|---|---|---|---|---|
| FR | 3081842 A1 | * | 12/2019 | B64G 1/222 |
| KR | 20070101342 A | * | 10/2007 | |
| KR | 2019052845 A | * | 5/2019 | E04H 12/32 |
| NL | 9300872 A | * | 12/1994 | E04H 12/32 |
| WO | WO-2016043679 A1 | * | 3/2016 | A63B 71/0054 |
| WO | WO-2016119035 A1 | * | 8/2016 | E04H 12/12 |
| WO | WO-2019114907 A1 | * | 6/2019 | E04H 12/18 |

\* cited by examiner

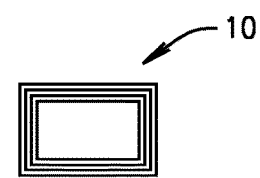
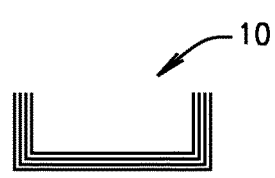
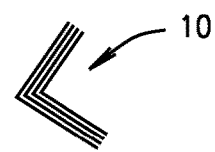
FIG.5A  FIG.5B  FIG.5C
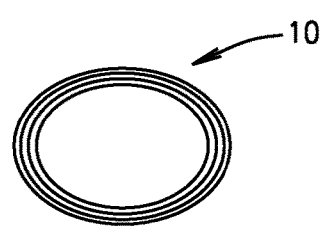
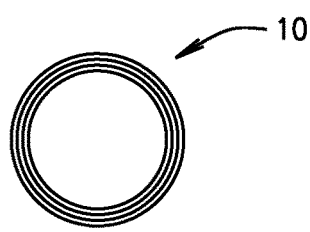
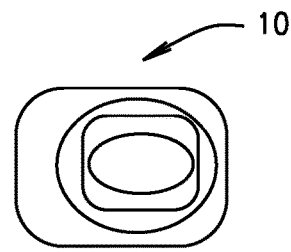
FIG.5D  FIG.5E  FIG.5F
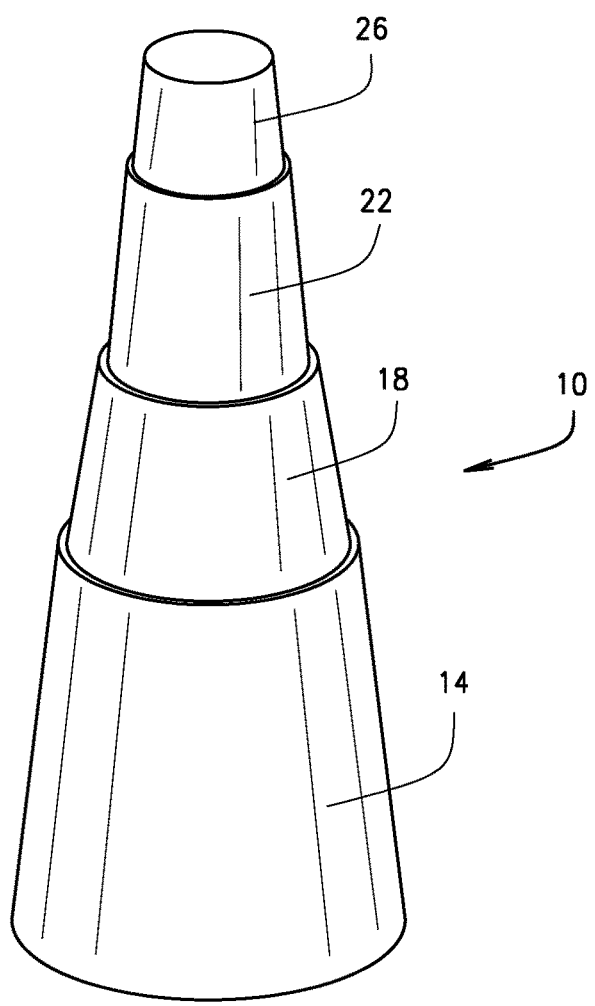
FIG.5G

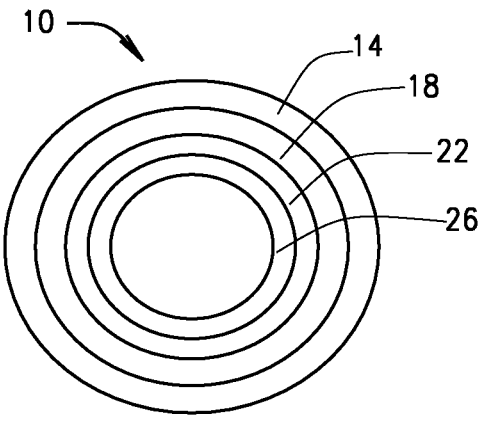 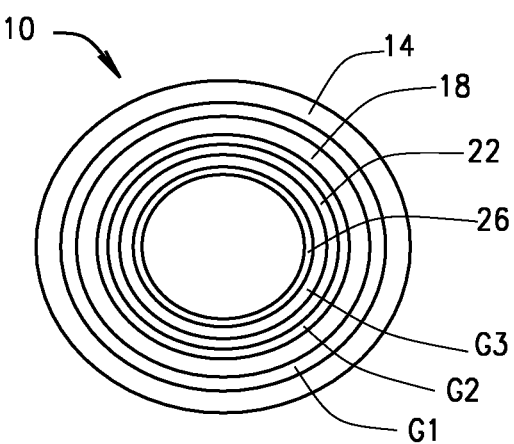
FIG. 6A  FIG. 6B
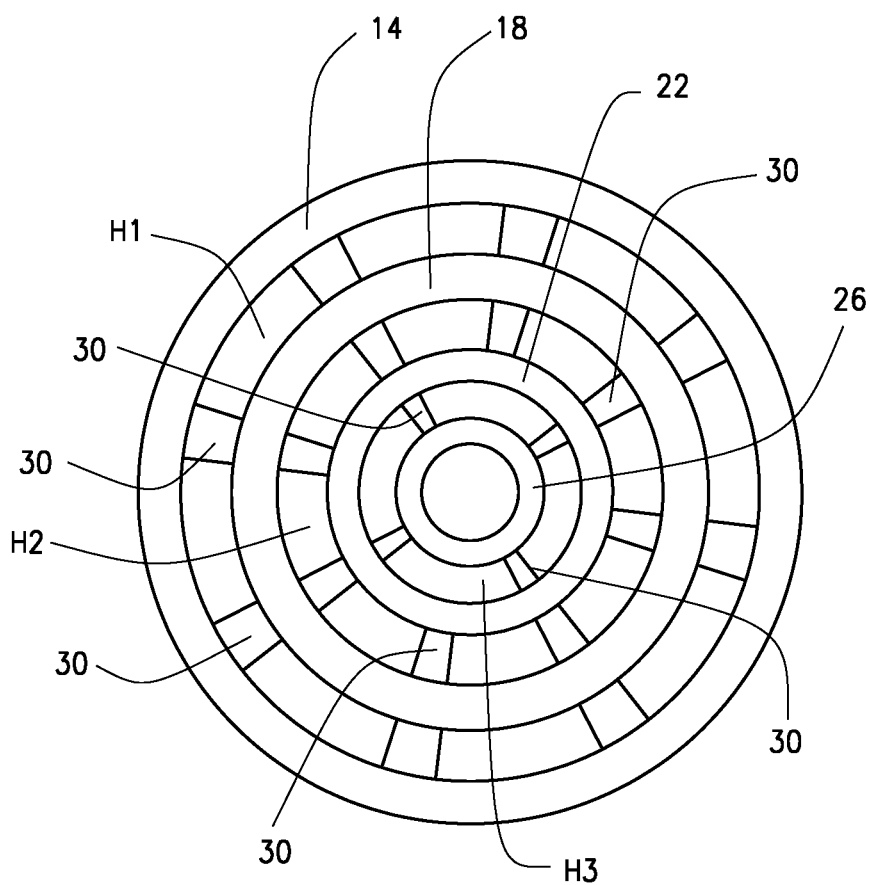
FIG. 7

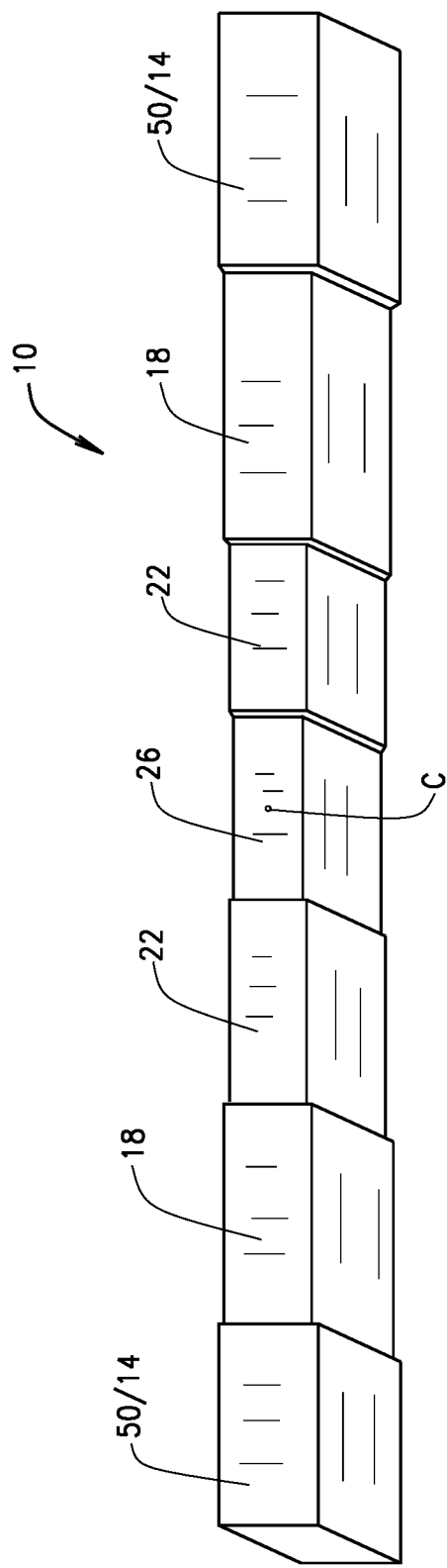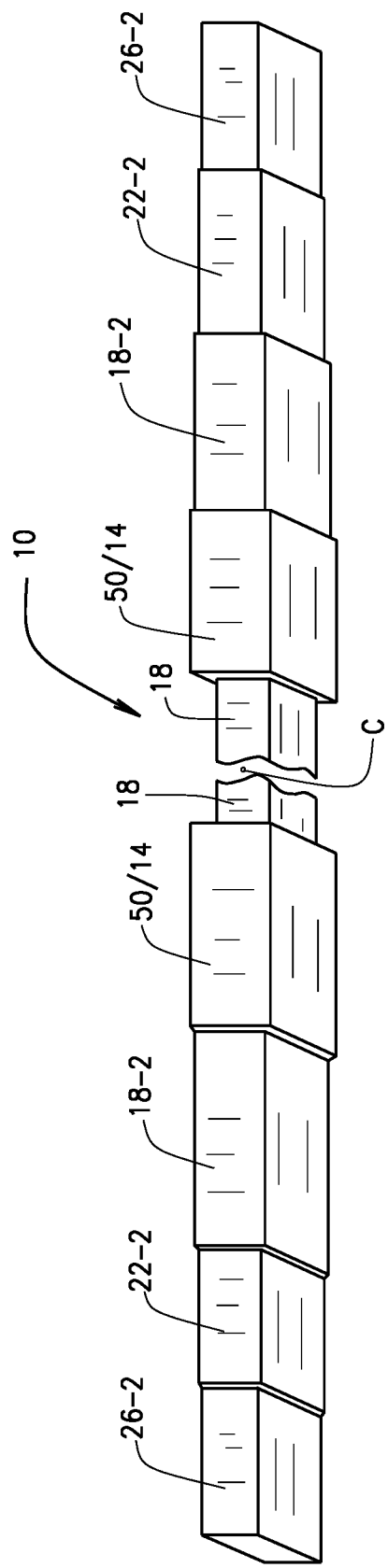

LAYERED MULTI-BODY SUPPORT STRUCTURE

CROSS-REFERENCE TO RELATED APPLICATIONS

This application is a continuation-in-part of U.S. patent application Ser. No. 16/653,056 filed on Oct. 15, 2019. The disclosure of the above application is incorporated herein by reference in its entirety.

FIELD

The present teachings relate to support structures, and more particularly to composite layered multi-body support structures for supporting various other items, structures, components, apparatus, and systems such as utilities, e.g., utility lines and substation structures, crossarms and braces.

BACKGROUND

The statements in this section merely provide background information related to the present disclosure and does not constitute prior art.

Most utility structures used today are made of wood, steel/metal, and/or concrete. Recently, structure used are composites with design limitations. Such existing structures have strength issues due to the potential for decay and corrosion. Other concerns are related to lack resiliency of the structures, weight of the structures, and conductivity. Most wood structures used today are pressure treated to preserve and protect from the weather, insects and other types of attacks and decay. Wooden structures are treated with a number of toxic and/or environmentally unfriendly chemicals such as pentachlorophenol, chromated copper arsenate, creosote, arsenic and others. Steel structures are expensive to build and hard to maintain, corrode over time, and are highly electrically conductive. Concrete poles are excessively heavy, they erode, are electrically conductive, expensive to build, and hard to maintain. Current patented composite structures are limited in design, limited in quantity, non-engineered space and inadequate balance for lifting point.

SUMMARY

In various embodiments, the present disclosure provides a layered multi-body support structure that comprises a plurality of elongated bodies concentrically disposed within each other. The plurality of elongated bodies comprising an innermost elongated body, an outermost elongated body and/or at least one intermediate elongated body disposed therebetween. Each elongated body has a proximal end, a distal end and a respective length that is different than the lengths of all the other elongated bodies, and wherein the length of at least one of the at least one intermediate elongated bodies and/or the outermost elongated body is longer than the innermost elongated body.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Figure 1:
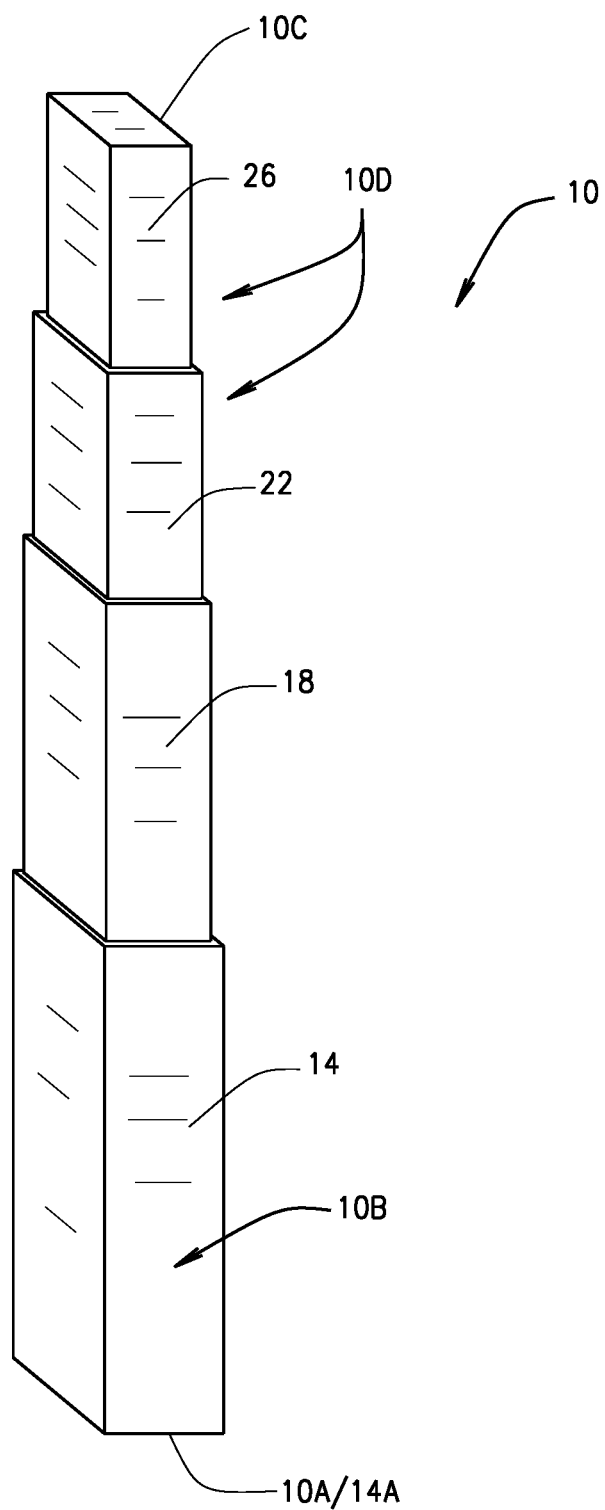
FIG. 1 is an isometric view of an exemplary layered multi-body support structure, in accordance with various embodiments of the present disclosure.

FIGS. 5A through 5G exemplarily illustrate various alternate profile shapes, cross-sectional shapes, and configurations of the elongated bodies of the layered multi-body support structure shown in FIG. 1, in accordance with various embodiments of the present disclosure.

FIG. 6A is a cross-sectional view of the layered multi-body support structure shown in FIG. 1 exemplarily illustrating no gap between the elongated bodies, in accordance with various embodiments of the present disclosure.

FIG. 6B is a cross-sectional view of the layered multi-body support structure shown in FIG. 1 exemplarily illustrating a small between the elongated bodies, in accordance with various embodiments of the present disclosure.

FIG. 7 is a cross-sectional view of the layered multi-body support structure shown in FIG. 1 exemplarily illustrating a predetermined gap between the elongated bodies, in accordance with various embodiments of the present disclosure.

FIG. 8 is an exemplary illustration of the layered multi-body support structure shown in FIG. 1 wherein the layered multi-body support structure comprises a plurality of fixation sections, in accordance with various embodiments of the present disclosure.

FIG. 9 is an exemplary illustration of the layered multi-body support structure shown in FIG. 1 wherein the layered multi-body support structure comprises a plurality of fixation sections, in accordance with various other embodiments of the present disclosure.

Figure 10A:
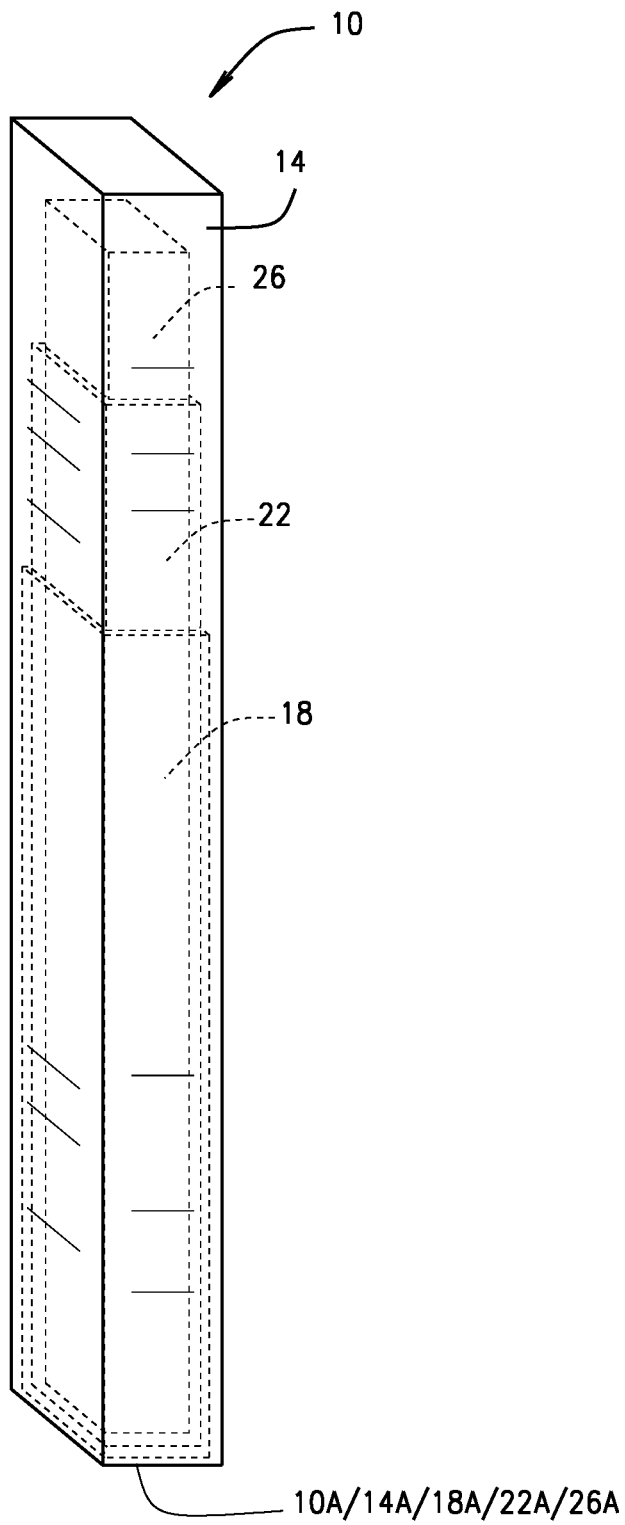

FIG. 10A is an exemplary illustration of a layered multi-body support structure having the respective elongated bodies disposed internally within a first elongated body, in accordance with various embodiments of the present disclosure.

Figure 10B:
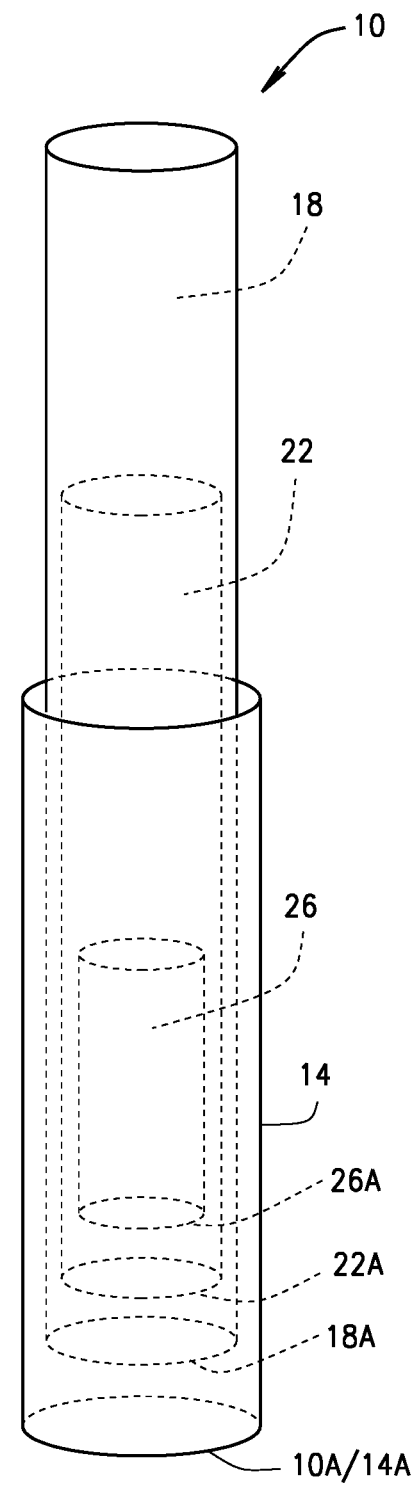

FIG. 10B is an exemplary illustration of a layered multi-body support structure having the respective elongated bodies disposed internally within a first elongated body, in accordance with various other embodiments of the present disclosure.

Figures 11A, 11B:
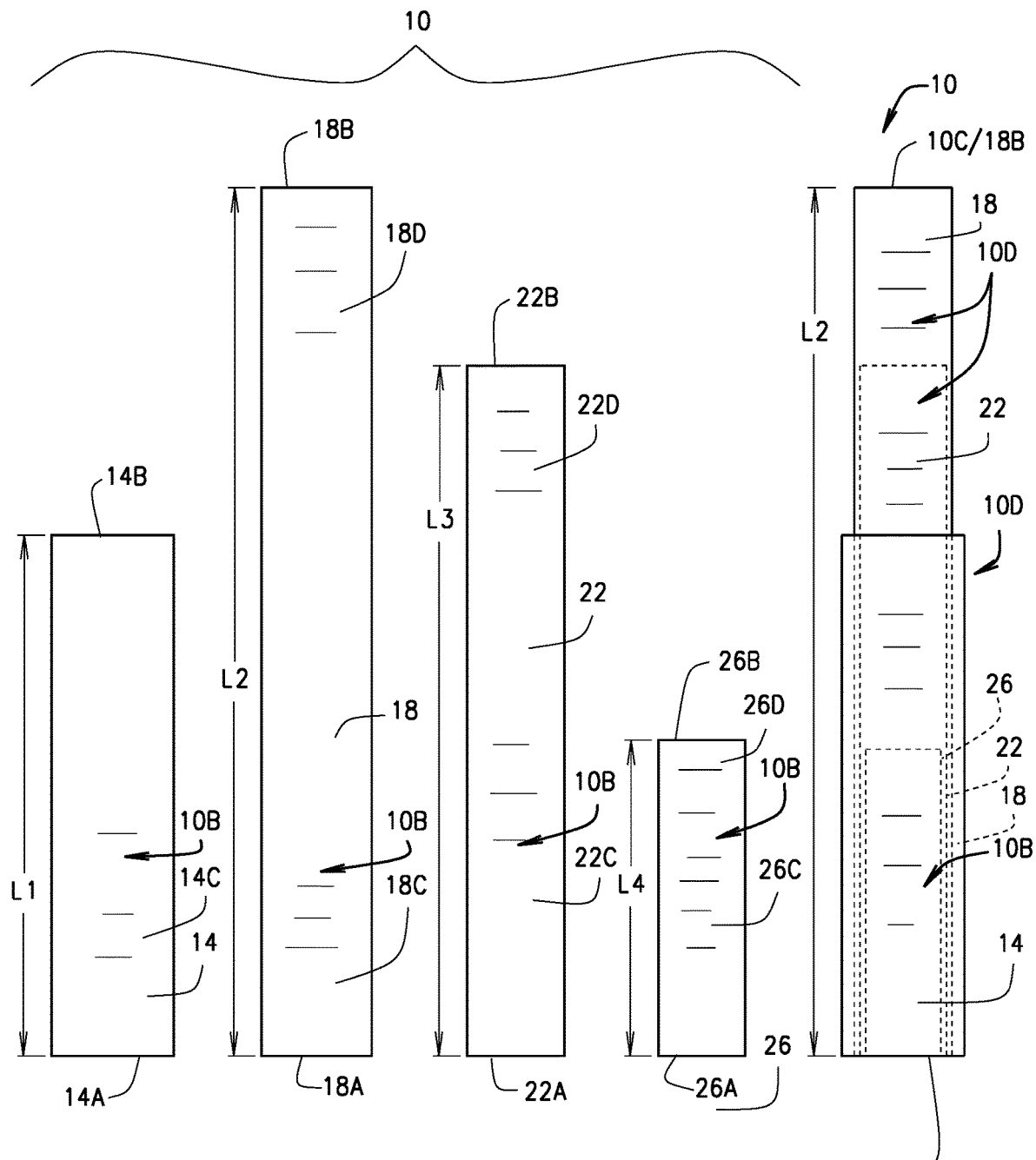

FIG. 11A is an exemplary illustration of the layered multi-body support structure in accordance with various other embodiments of the present disclosure.

FIG. 11B is a side view of the layered multi-body support structure shown in FIG. 11A, in accordance with various embodiments of the present disclosure.

Figure 12:
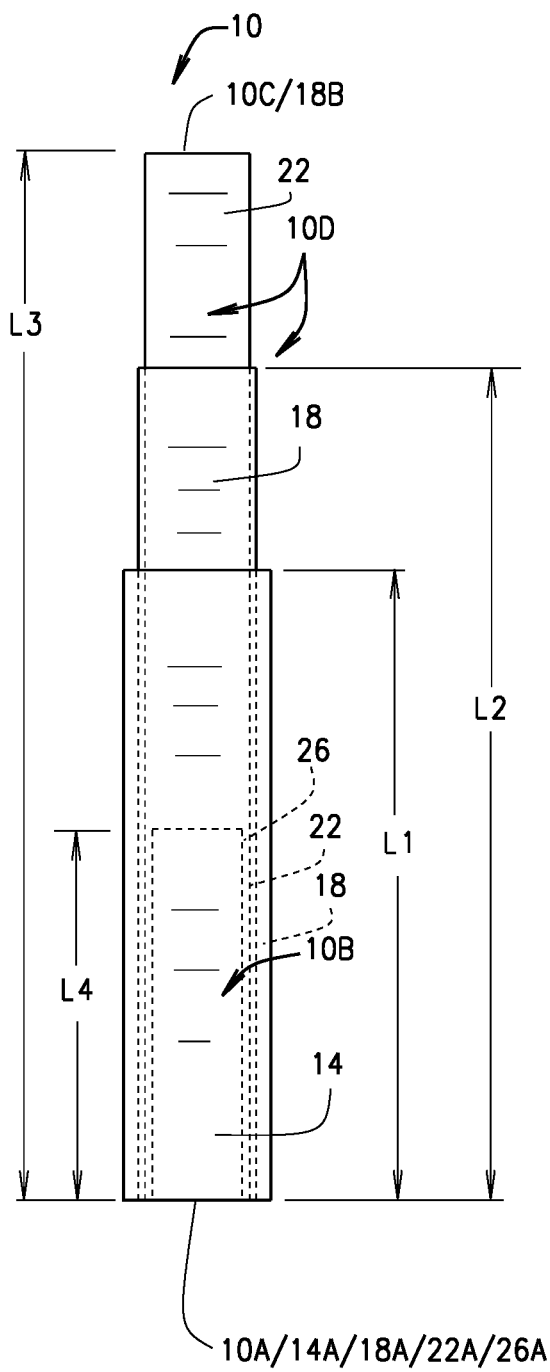

FIG. 12 is a side view of the layered multi-body support structure, in accordance with various other embodiments of the present disclosure.

It should be noted that the present disclosure is not limited to the exemplary profile shapes shown in FIGS. 1 through 12, and that other configurations in same and alternate patterns are within the scope of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts are causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, fourth, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Referring now to FIGS. 1 and 12, as exemplarily illustrated in FIGS. 1 and 12 the present disclosure provides a layered multi-body support structure (e.g., a layered multi-body utility support structure) exemplarily illustrated in FIG. 1 as a layered multi-body support structure 10, and exemplarily illustrated in FIG. 12 as a layered multi-body support structure 10. The layered multi-body support structure 10 is fabricated of an environmentally friendly material (for example a composite material) and has added strength and minimum engineered deflection as compared to known wood, steel, concrete and other type support structures. Additionally, the support structure 10 comprises and engineered lifting balance point and is lighter, easier and less expensive to install than known wood, steel and concrete support structures. The engineered lifting balance point should be understood to be a point based on the number of layers and the length of layers for safe and/or proper lifting of the support structure 10 during installation.

In various implementations, the support structure 10 can be installed and utilized in a vertical orientation wherein a proximal end 10A and/or a proximal end portion 10B are fixable to the ground, e.g., the proximal end 10A and/or proximal end portion 10B can be buried in the ground, or affixed to a structure affixed to the ground, e.g., a concrete platform a least partially buried in the ground. In such implementations other structures, devices, mechanisms, apparatus, systems, such as utility components (e.g., electrical and/or communication and/or optical wires or cables) or crossbar members for supporting such utility components can be connected to a distal end 10C and/or distal end portion 10D of the support structure 10. In various other implementations, the support structure 10 can be installed and utilized in a horizontal orientation wherein the proximal end 10A and/or proximal end portion 10B are fixable to another structure, such as an existing pole, building, tower, or another support structure 10 disposed in the vertical orientation. In such implementations other structures, devices, mechanisms, apparatus, systems, such as utility components (e.g., electrical and/or communication and/or optical wires or cables) or crossbar members for supporting such utility components can be connected to the distal end 10C and/or distal end portion 10D of the support structure 10 and/or any other portion along the entire length of the support structure 10.

As described below, in yet various other implementations, the support structure 10 can be constructed and configured to be disposed in the horizontal orientation and be fixable to one or more other structure (e.g., one or more existing pole, building, tower, or another support structure(s) 10 disposed in the vertical orientation) at a plurality of fixation sections, areas, or portions of the support structure 10 (e.g., portion 50 exemplarily illustrated in FIGS. 8 and 9). In such implementations other structures, devices, mechanisms, apparatus, systems, such as utility components (e.g., electrical and/or communication and/or optical wires or cables) or crossbar members for supporting such utility components can be connected to any portion of the support structure 10 along the entire length of the support structure 10.

Figures 2A, 2B:
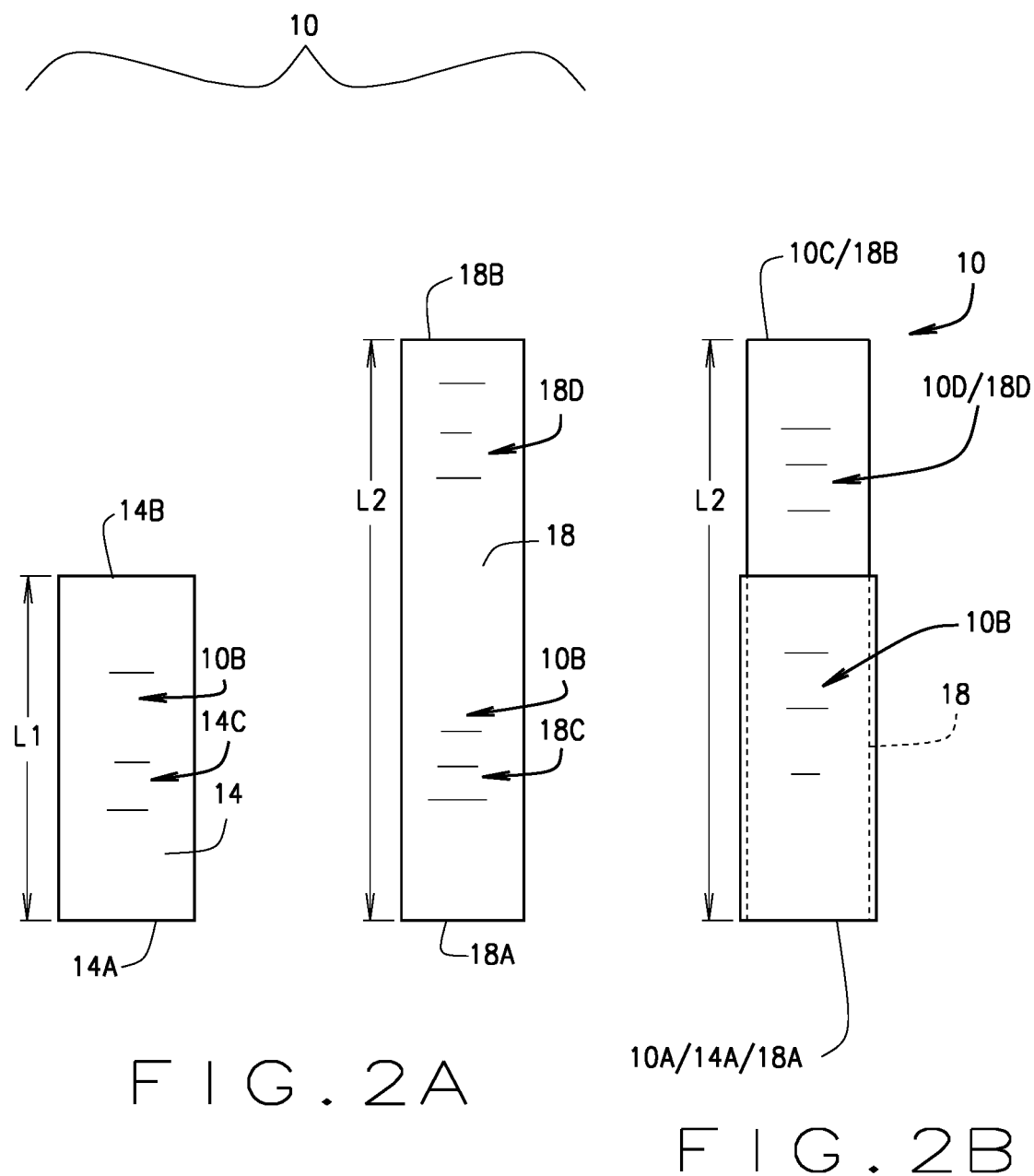
FIG. 2A is an exploded side view of the layered multi-body support structure shown in FIG. 1 wherein the layered multi-body support structure comprises two elongated bodies, in accordance with various embodiments of the present disclosure.
FIG. 2B is a side view of the layered multi-body support structure shown in FIG. 2A, in accordance with various embodiments of the present disclosure.

Referring now to FIGS. 2A and 2B, in various embodiments, the support structure 10 comprises a hollow first elongated body 14 and a second elongated body 18. The first elongated body 14 has a first length L1, a proximal end 14A, and an opposing distal end 14B. The second elongated body 18 has a second length L2 that is longer than the first length L1, a proximal end 18A and an opposing distal end 18B. The second elongated body 18 is disposed internally and concentrically within the first elongated body 14 such that the second elongated body 18 is supported by the first elongated body 14. Moreover, in various embodiments, the proximal end 18A of the second elongated body 18 is substantially flush with the proximal end 14A of the first elongated body 14. Alternatively, in various embodiments, it is envisioned that the proximal end 18A of the second elongated body 18 can extend beyond and protrude out past the proximal end 14A of the first elongated body 14. Therefore, in such embodiments, the proximal end 10A of the support structure 10 comprises the proximal ends 14A and 18A of the first and second elongated bodies 14 and 18, and the proximal end portion 10B of the support structure 10 comprises a proximal end portion 14C of the first elongated body 14 and a proximal end portion 18C of the second elongated body 18. The proximal end portion 14C of the first elongated body 14 is adjacent to and contiguous with the proximal end 14A of the first elongated body 14. Similarly, the proximal end portion 18C of the second elongated body 18 is adjacent to and contiguous with the proximal ends 14A and 18A of the first and second elongated bodies 14 and 18. Additionally, in such embodiments, the distal end 10B of the support structure 10 comprises the distal end 18B of the second elongated body 18, and the distal end portion 10D of the support structure 10 comprises a distal end portion 18D of the second elongated body 18. Furthermore, in such embodiments, the length of the support structure is equal to the length L2 of the second elongated body 18.

Accordingly, in such embodiments, when the support structure 10 is disposed in the vertical orientation, the proximal end 10A (i.e., the first and second elongated body proximal ends 14A and 18A) and/or the proximal end portion 10B (i.e., the first and second elongated body proximal end portions 14C and 18C) are fixable to the ground. Additionally, other structures, devices, mechanisms, apparatus, systems, such as utility components (e.g., electrical and/or communication and/or optical wires or cables), or crossbar members for supporting such utility components, can be connected to a distal end 10C of the support structure 10 (i.e., the second elongated body distal end 18B) and/or the distal end portion 10D of the support structure 10 (i.e., the second elongated body distal end portion 18D). Similarly, in such embodiments, when the support structure 10 is disposed in the horizontal orientation, the proximal end 10A (i.e., the first and second elongated body proximal ends 14A and 18A) and/or the proximal end portion 10B (i.e., the first and second elongated body proximal end portions 14C and 18C) are fixable to another structure, such as an existing pole, building, tower, or another support structure 10 disposed in the vertical orientation, and other structures, devices, mechanisms, apparatus, systems, such as utility components (e.g., electrical and/or communication and/or optical wires or cables), or crossbar members for supporting such utility components, can be connected to the distal end 10C (i.e., the second elongated body distal end 18B) and/or the distal end portion 10D of the support structure 10 (i.e., the second elongated body distal end portion 18D).

Figures 3A, 3B:
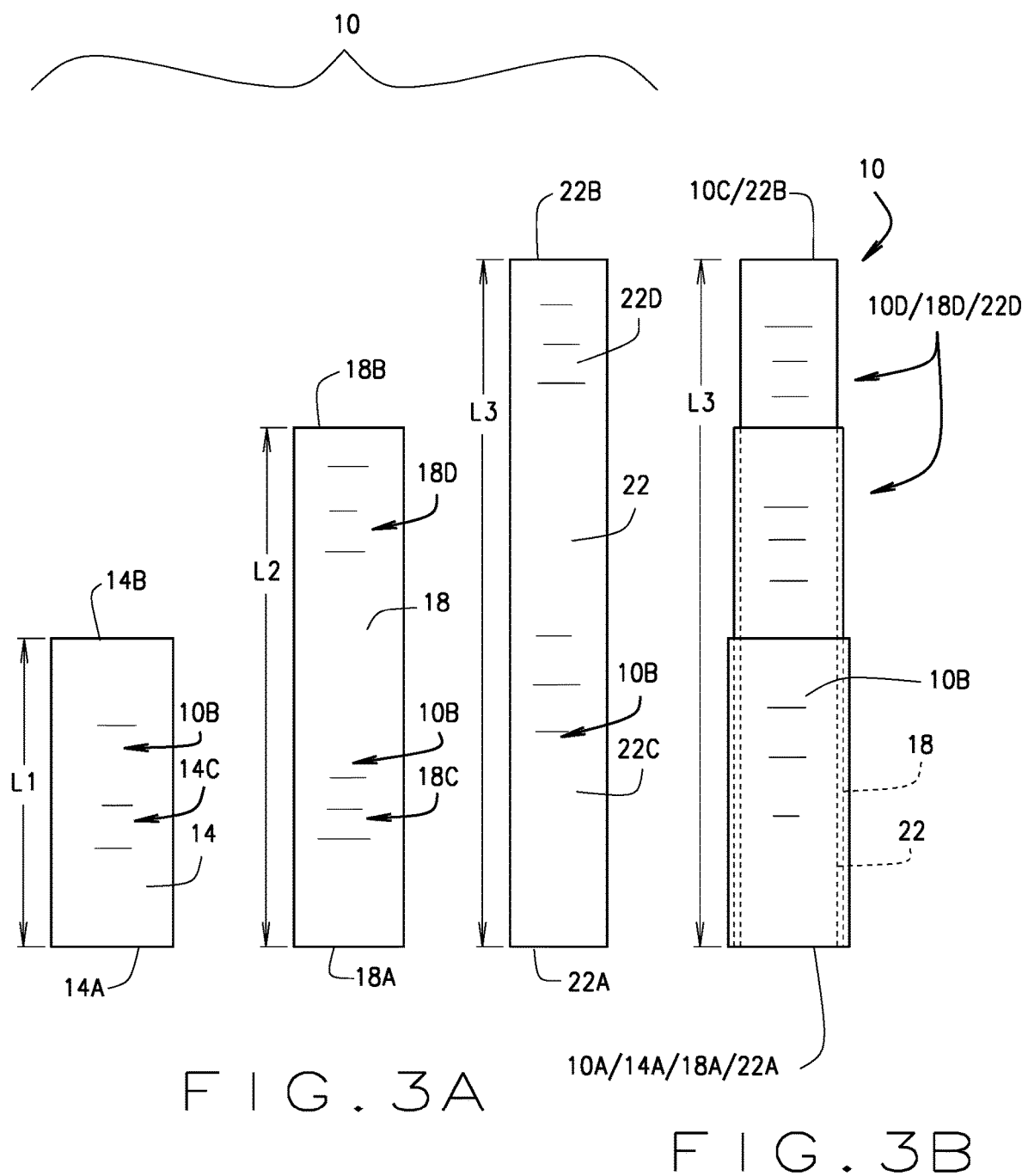
FIG. 3A is an exploded side view of the layered multi-body support structure shown in FIG. 1 wherein the layered multi-body support structure comprises three elongated bodies, in accordance with various embodiments of the present disclosure.
FIG. 3B is a side view of the layered multi-body support structure shown in FIG. 3A, in accordance with various embodiments of the present disclosure.

Referring now to FIGS. 3A and 3B, in various embodiments, the support structure 10 comprises the hollow first elongated body 14, the second elongated body 18 and a third elongated body 22. In such embodiments, the first elongated body 14 has the first length L1, the proximal end 14A, and the opposing distal end 14B, and the second elongated body 18 is hollow and has the second length L2 that is longer than the first length L1, the proximal end 18A and the opposing distal end 18B. The third elongated body has a third length L3 that is longer than the second length L2, a proximal end 22A, and an opposing distal end 22B. The second elongated body 18 is disposed internally and concentrically within the first elongated body 14 such that the second elongated body 18 is supported by the first elongated body 14 and the third elongated body 22 is disposed internally and concentrically within the second elongated by 18 such that the third elongated body 22 is supported by the first and second elongated bodies 14 and 18. Moreover, the proximal end 22A of the third elongated body 22 is substantially flush with the proximal ends 14A and 18A of the first and second elongated bodies 14 and 18. Alternatively, in various embodiments, it is envisioned that the proximal end 18A of the second elongated body 18 and/or the proximal end 22A of the third elongated body 22 can extend beyond and protrude out past the proximal end 14A of the first elongated body 14, and/or the proximal end 22A of the third elongated body 22 can extend beyond and protrude out past the proximal end 18A of the second elongated body 18. Therefore, in such embodiments, the proximal end 10A of the support structure 10 comprises the proximal ends 14A, 18A and 22A of the first, second and third elongated bodies 14, 18 and 22, and the proximal end portion 10B of the support structure 10 comprises a proximal end portions 14C and 18C of the first and second elongated bodies 14 and 18 and a proximal end portion 22C of the third elongated body 18. The proximal end portion 22C of the third elongated body 22 is adjacent to and contiguous with the proximal ends 14A, 18A, 22A of the first, second and third elongated bodies 14, 18 and 22. Additionally, in such embodiments, the distal end 10B of the support structure 10 comprises the distal end 22B of the third elongated body 22, and the distal end portion 10D of the support structure 10 comprises a distal end portion 22D of the third elongated body 22, and in various instances, the distal end portion 18D of the second elongated body 18. Furthermore, in such embodiments, the length of the support structure is equal to the length L3 of the third elongated body 22.

Accordingly, in such embodiments, when the support structure 10 is disposed in the vertical orientation, the proximal end 10A (i.e., the first, second and third elongated body proximal ends 14A, 18A and 22A) and/or the proximal end portion 10B (i.e., the first, second and third elongated body proximal end portions 14C, 18C and 22C) are fixable to the ground. Additionally, other structures, devices, mechanisms, apparatus, systems, such as utility components (e.g., electrical and/or communication and/or optical wires or cables), or crossbar members for supporting such utility components, can be connected to a distal end 10C of the support structure 10 (i.e., the third elongated body distal end 22B) and/or the distal end portion 10D of the support structure 10 (i.e., the third and/or second elongated body distal end portions 22D and/or 18D). Similarly, in such embodiments, when the support structure 10 is disposed in the horizontal orientation, the proximal end 10A (i.e., the first, second and third elongated body proximal ends 14A, 18A and 22A) and/or the proximal end portion 10B (i.e., the first, second and third elongated body proximal end portions 14C, 18C and 22C) are fixable to another structure, such as an existing pole, building, tower, or another support structure 10 disposed in the vertical orientation, and other structures, devices, mechanisms, apparatus, systems, such as utility components (e.g., electrical and/or communication and/or optical wires or cables), or crossbar members for supporting such utility components, can be connected to the distal end 10C (i.e., the third elongated body distal end 22B) and/or the distal end portion 10D of the support structure 10 (i.e., the third and/or second elongated body distal end portions 22D and/or 18D).

Figures 4A, 4B:
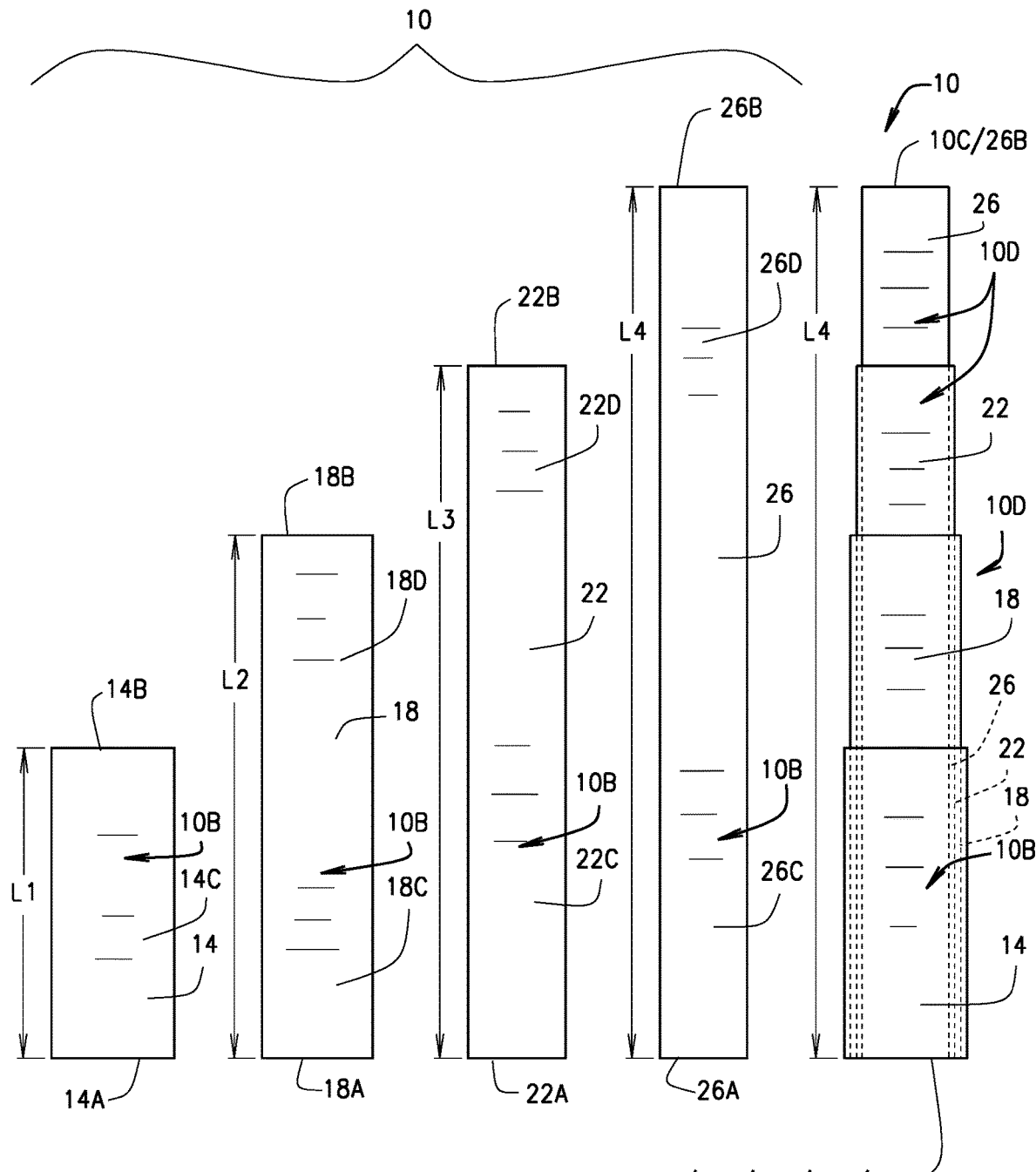
FIG. 4A is an exploded side view of the layered multi-body support structure shown in FIG. 1 wherein the layered multi-body support structure comprises four elongated bodies, in accordance with various embodiments of the present disclosure.
FIG. 4B is a side view of the layered multi-body support structure shown in FIG. 4A, in accordance with various embodiments of the present disclosure.

Referring now to FIGS. 4A and 4B, in various embodiments, the support structure 10 comprises the hollow first elongated body 14, the hollow second elongated body 18, the third elongated body 22 and a fourth elongated body 26. In such embodiments, the first elongated body 14 has the first length L1, the proximal end 14A, and the opposing distal end 14B; the second hollow elongated body 18 has the second length L2 that is longer than the first length L1, the proximal end 18A and the opposing distal end 18B; the third elongated body is hollow and has the third length L3, the proximal end 22A, and the opposing distal end 22B; and the fourth elongated body has a fourth length L4 that is longer than the third length L3, a proximal end 26A, and an opposing distal end 26B. The second elongated body 18 is disposed internally and concentrically within the first elongated body 14 such that the second elongated body 18 is supported by the first elongated body 14, the third elongated body 22 is disposed internally and concentrically within the second elongated by 18 such that the third elongated body 22 is supported by the first and second elongated bodies 14 and 18, and the fourth elongated body 26 is disposed internally and concentrically within the third elongated by 22 such that the fourth elongated body 26 is supported by the first, second and third elongated bodies 14, 18 and 22. Moreover, the proximal end 26A of the fourth elongated body 26 is substantially flush with the proximal ends 14A, 18A and 22A of the first, second and third elongated bodies 14, 18 and 22. Alternatively, in various embodiments, it is envisioned that the proximal end 18A of the second elongated body 18 and/or the proximal end 22A of the third elongated body 22 and/or the proximal end 26A of the fourth elongated body 26 can extend beyond and protrude out past the proximal end 14A of the first elongated body 14, and/or the proximal end 22A of the third elongated body 22 can extend beyond and protrude out past the proximal end 18A of the second elongated body 18, and/or the proximal end 26A of the fourth elongated body 26 can extend beyond and protrude out past the proximal end 22A of the third elongated body 22. Therefore, in such embodiments, the proximal end 10A of the support structure 10 comprises the proximal ends 14A, 18A, 22A and 26A of the first, second, third and fourth elongated bodies 14, 18, 22 and 26, and the proximal end portion 10B of the support structure 10 comprises a proximal end portions 14C, 18C and 22C of the first, second and third elongated bodies 14, 18 and 22 and a proximal end portion 26C of the fourth elongated body 18. The proximal end portion 26C of the fourth elongated body 26 is adjacent to and contiguous with the proximal ends 14A, 18A, 22A and 26A of the first, second, third and fourth elongated bodies 14, 18, 22 and 26. Additionally, in such embodiments, the distal end 10B of the support structure 10 comprises the distal end 26B of the fourth elongated body 26, and the distal end portion 10D of the support structure 10 comprises a distal end portion 26D of the fourth elongated body 26, and in various instances, at least one of the distal end portions 18D and 22D of the second and third elongated bodies 18 and 22. Furthermore, in such embodiments, the length of the support structure is equal to the length L4 of the fourth elongated body 26.

Accordingly, in such embodiments, when the support structure 10 is disposed in the vertical orientation, the proximal end 10A (i.e., the first, second, third and fourth elongated body proximal ends 14A, 18A, 22A and 26A) and/or the proximal end portion 10B (i.e., the first, second, third and fourth elongated body proximal end portions 14C, 18C, 22C and 26C) are fixable to the ground. Additionally, other structures, devices, mechanisms, apparatus, systems, such as utility components (e.g., electrical and/or communication and/or optical wires or cables), or crossbar members for supporting such utility components, can be connected to a distal end 10C of the support structure 10 (i.e., the fourth elongated body distal end 26B) and/or the distal end portion 10D of the support structure 10 (i.e., the fourth and/or third and/or second elongated body distal end portions 26D and/or 22D and/or 18D). Similarly, in such embodiments, when the support structure 10 is disposed in the horizontal orientation, the proximal end 10A (i.e., the first, second, third and fourth elongated body proximal ends 14A, 18A, 22A and 26A) and/or the proximal end portion 10B (i.e., the first, second, third and fourth elongated body proximal end portions 14C, 18C, 22C and 26C) are fixable to another structure, such as an existing pole, building, tower, or another support structure 10 disposed in the vertical orientation, and other structures, devices, mechanisms, apparatus, systems, such as utility components (e.g., electrical and/or communication and/or optical wires or cables), or crossbar members for supporting such utility components, can be connected to the distal end 10C (i.e., the fourth elongated body distal end 26B) and/or the distal end portion 10D of the support structure 10 (i.e., the fourth and/or third and/or second elongated body distal end portions 26D and/or 22D and/or 18D).

Referring now to FIGS. 1, 2A, 2B, 3A, 3B, 4A and 4B, although the support structure 10 has been exemplarily described above to include two, three and four nested elongated bodies, it is envisioned that the support structure 10 can include any number of bodies nested as described above such that their respective proximal ends are all flush with each other, and thereby comprise the proximal end of the respective support structure 10, and remain within the scope of the present disclosure. For example, in various embodiments, the support structure 10 can comprise from two to fifty elongated bodies nested internally and concentrically within each other as described above, such that all their respective proximal ends are all flush with each other, and thereby comprise the proximal end of the respective support structure 10. As a further example, in various embodiments, the support structure 10 can comprise the hollow first elongated body 14 having the first length L1, the proximal end 14A, and the opposing distal end 14B, and one or more $n^{th}$ elongated body nested internally and concentrically within each other. In exemplary instances, n can equal two through fifty. In such embodiments, each $n^{th}$ elongated body has an $n^{th}$ length that is longer than the first length L1, the length of the (n−1) elongated body and all intervening elongated body lengths. Additionally, each $n^{th}$ body has a proximal end and an opposing distal end, and each $n^{th}$ elongated body is disposed internally and concentrically within the first elongated body and internally and concentrically within the (n−1) elongated body such that the respective $n^{th}$ elongated body is supported by each of the first through the (n−1) elongated bodies. Moreover, each $n^{th}$ elongated body is nested internally and concentrically within each other such that the proximal end of each $n^{th}$ elongated body is substantially flush with the proximal ends of each of the first through the (n−1) elongated bodies. As described above, depending on the orientation in which the support structure 10 is disposed, the support structure 10 is fixable to the ground and/or any other structure at a proximal end portion thereof that is adjacent to and contiguous with the proximal ends of the first through the $n^{th}$ elongated bodies.

Referring now to FIGS. 5A through 5G, although the longitudinal shape or profile of the elongated bodies (e.g., 14, 18, 22 and 26) of the layered multi-body support structure 10 has been exemplarily illustrated in various Figures as having a consistent diameter or width along its entire length, and the cross-sectional shape has exemplarily been illustrated as square or rectangular, it is envisioned that the profile and/or cross-sectional shape can have any desired shape or multiple shapes and remain within the scope of the present disclosure. For example, it is envisioned that in various instances the cross-sectional shape of each of the elongated bodies of the respective support structure 10 can have the shape of a quadrilateral (e.g., a parallelogram, a square, or a rectangle) as illustrated in FIG. 5A; or be shaped as C shaped channel as illustrated in FIG. 5B; or be shaped as a V shaped channel as illustrated in FIG. 5C; or have an oval shape as illustrated in FIG. 5D; or have a circular shape as illustrated in FIG. 5E; or any other desired shape such as a triangle, hexagon, octagon, star, etc. Or, in other instances, one or more of the elongated bodies can have a different cross-sectional shape than one or more of the other elongated bodies of the respective support structure as illustrated in FIG. 5F. Additionally, in various embodiments, one or more of the elongated bodies can have a longitudinal shape or profile that is not consistent along its entire length. For example, as illustrated in FIG. 5G, in various embodiments one or more of the elongated bodies can have a longitudinal shape or profile that is conical or narrower at one end than the opposing end. Furthermore, as exemplarily illustrated in FIGS. 5A through 5E, in various embodiments, one or more of the elongated bodies can have a wall thickness that is different than that of one or more of the other elongated bodies.

Referring now to FIG. 6A, in various embodiments, the support structure 10 can be constructed and configured as described above to have substantially no space or gap constructed or assembled between two or more adjacent elongated bodies (e.g., 14, 18, 22, 26 and/or $n^{th}$).

Referring now to FIG. 6B, alternatively, it is envisioned that in various embodiments, the support structure 10 can be constructed and configured as described above to have a small or engineered space or gap e.g., G1, G2, G3, etc., between two or more adjacent elongated bodies. For example, in various instances, the support structure 10 can be constructed and configured to have gaps G1, G2, G3, etc., that are between approximately 0.01 and 0.07 inches between two or more adjacent elongated bodies (e.g., 14, 18, 22, 26 and/or $n^{th}$). As a particular example, in various embodiments, the second elongated body 18/218 can be disposed internally and concentrically within the first elongated body 14/214 such that there is a gap G1 between an outer surface of the second elongated body 18/218 and an inner surface of the first elongated body 14/214, wherein the gap G1 is between 0.01 and 0.07 inches.

Alternatively, as exemplarily illustrated in FIG. 7, in various embodiments, the support structure 10 can be constructed and configured as described above to have a predetermined gap between two or more adjacent elongated bodies (e.g., 14, 18, 22, 26 and/or $n^{th}$). For example, in various instances, the support structure 10 can be constructed and configured to have predetermined gaps H1, H2, H3, etc., between two or more adjacent elongated bodies wherein the gap(s) H1, H2 and/or H3, etc. can be between approximately 0.25 and 3.0 inches (e.g., between approximately 1.0 and 2.0 inches). As a particular example, in various embodiments, the second elongated body 18/218 can be disposed internally and concentrically within the first elongated body 14/214 such that there is a gap H1 between an outer surface of the second elongated body 18/218 and an inner surface of the first elongated body 14/214, wherein the gap H1 is between 0.25 and 3.0 inches (e.g., between approximately 1.0 and 2.0 inches). In such embodiments, the support structure 10 additionally comprise a plurality of spacers 30 disposed between the adjacent elongated bodies that are structured and operable to retain the respective inner elongated bodies internally and concentrically within the respective outer elongated bodies and provide structural strength, support and integrity to the respective support structure 10. In various embodiments, the spacers 30 can be disposed along and extend radially inward from at least a portion of the radially inward/inner surface(s) of the respective outer elongated bodies. Alternatively, in various embodiments, the spacers 30 can be disposed along and extend radially outward from at least a portion of the radially outward/outer surface(s) of the respective inner elongated bodies.

Referring now to FIGS. 8 and 9, as described above, in various implementations, the support structure 10 can be constructed and configured to be disposed in the horizontal orientation and be fixable to a plurality of other structures (e.g., two or more existing poles, buildings, towers, or another support structures 10 disposed in the vertical orientation) at a plurality of fixation sections, areas, or portions of the support structure 10 (exemplarily illustrated in FIGS. 8 and 9 as fixation portion 50 of support structure 10). For example, as exemplarily illustrated in FIG. 8, in various embodiments the support structure 10 can be constructed and fabricated to comprise two first elongated bodies 14 disposed at opposing ends of the respective support structure 10, and one or more $n^{th}$ elongated body extending inward from the first elongated bodies 14 toward a center C of the support structure 10. In various instances of such embodiments, the two first elongated bodies 14 can provide the fixation sections 50. For example, as shown by way of example in FIG. 8, the support structure 10 can comprise two second elongated bodies 18 extending inward from the first elongated bodies 14 toward the center C of the support structure 10, two third elongated bodies 22 extending inward from the second elongated bodies 18 toward a center C of the support structure 10, and a common fourth elongated body 26 joining the opposing third elongated bodies 22, whereby the two first elongated bodies 14 can provide the fixation sections 50.

Referring now to FIG. 9, in various other embodiments wherein the support structure 10 can be constructed and configured as described above with regard to FIG. 8 comprising a plurality of fixation sections, areas, or portions 50, the support structure 10 can further include one or more $n^{th}$ elongated structure extending outward from the one or more of the first elongated bodies and fixation sections 14/50 away from the center C. Particularly, in FIG. 9, the inward extending elongated bodies 18, 22 and 26 shown in FIG. 8 are represented by the separated/broken line portion in the center of FIG. 9 that extends inward toward the center C from the fixation sections, areas, or portions 50/14. In such embodiments, as exemplarily illustrated in FIG. 9, the support structure 10 can be constructed and fabricated as described with regard to FIG. 8 and further include, extending outward from the fixation portions/first elongated bodies 50/14 and away from the center C, two additional second elongated bodies 18-2, two additional third elongated bodies 22-2 extending outward from the additional second elongated bodies 18-2 away from the center C of the support structure, and two additional fourth elongated bods 26-2 extending outward from the additional third elongated bodies 22-2 away from the center C of the support structure. In such embodiments the two first elongated bodies 14 can provide the fixation sections 50.

Referring now to FIGS. 10A and 10B, it is envisioned that in various embodiments, the support structure 10 can be constructed and configured to have the nth elongated bodies (e.g., the second elongated body 18, the third elongated body 22 and/or the fourth elongated body 26) disposed and nested inside, or internally and concentrically within, the first elongated body 14, as exemplarily illustrated in FIG. 10A. In such embodiments the first elongated body 14 would have a length equal to the entire length of the respective support structure 10. It is envisioned that such a configuration can add further engineered strength with minimize top deflection and uniform outside cross section of the support structure 10. In various instances of such embodiments, the proximal ends (e.g., 14A, 18A, 22A and 26A) of each elongated body (e.g., 14, 18, 22 and 26)) can be substantially flush with the proximal ends of each of the other elongated bodies. Alternatively, in various other instances of such embodiments, it is envisioned that the proximal end 18A of the second elongated body 18 and/or the proximal end 22A of the third elongated body 22 and/or the proximal end 26A of the fourth elongated body 26 can extend beyond and protrude out past the proximal end 14A of the first elongated body 14, and/or the proximal end 22A of the third elongated body 22 can extend beyond and protrude out past the proximal end 18A of the second elongated body 18, and/or the proximal end 26A of the fourth elongated body 26 can extend beyond and protrude out past the proximal end 22A of the third elongated body 22. As described above, depending on the orientation in which the support structure 10 is disposed, the support structure 10 is fixable to the ground and/or any other structure at a proximal end portion thereof that is adjacent to and contiguous with the proximal ends of the elongated bodies.

As exemplarily illustrated in FIG. 10B, in various embodiments, the support structure 10 (as exemplarily illustrated in any one or more of the FIGS. 1 through 12) can be structured and configured such that the first, second, third, fourth . . . $n^{th}$ elongated bodies 14, 18, 22, 26, etc., can be disposed within each other as described herein, such that the respective proximal ends 14A, 18A, 22A, 26A, etc., are not flush and the proximal ends second, third, fourth . . . $n^{th}$ proximal ends 18A, 22A, 26A, etc., are disposed internally of/from first proximal end 14A. In such instances the respective proximal ends 14A, 18A, 22A, 26A, etc., can be the first, second, third, fourth . . . $n^{th}$ elongated bodies 14, 18, 22, 26, etc., can be disposed within each other such that one or more of the proximal ends 14A, 18A, 22A, 26A, etc., can be flush with one or more of the other proximal ends 14A, 18A, 22A, 26A, etc., or such that none of the proximal ends 14A, 18A, 22A, 26A, etc., are flush with any other of the proximal ends 14A, 18A, 22A, 26A, etc.

Referring now to FIGS. 10A, 10B, 11A, 11B and 12, it is further envisioned that in various embodiments the support structure 10 can be constructed and configured such that the longest elongated body can have one or more shorter elongated body disposed and nested inside, or internally and concentrically within, the longest elongated body and one or more shorter elongated body disposed and nested outside, or externally about, the longest elongated body. For example, as exemplarily illustrated in FIGS. 11A and 11B, the support structure 10 can comprise the first elongated body 14 having the first length L1, the second elongated body 18 having the second length L2 and disposed internally and concentrically within the first elongated body 14, the third elongated body 22 having the third length L3 and disposed internally and concentrically within the second elongated body 18, and the fourth elongated body 26 having the fourth length L4 and disposed internally and concentrically within the third elongated body 22 (and so on to the $n^{th}$ elongated body), wherein the length L2 is longer than L1, L3 and L4 . . . . $Ln^{th}$. Furthermore, in such exemplary embodiments: the length L1 can be shorter than L2 and L3, but longer L4; the length L2 can be longer than L1, L3 and L4; the length L3 can be shorter than L2, but longer than L1 and L4; and the length L4 can be shorter than L1, L2 and L3. Hence, in such exemplary embodiments the longest (e.g., the first longest) elongated body can be the second elongated body 18; the next longest (e.g., the second longest) elongated body is the third elongated body 22, which is disposed internally and concentrically within the second elongated body 18; the next longest (e.g., the third longest) elongated body is the first elongated body 14, which is disposed externally outside the second elongated body 18; and the shortest (e.g., the fourth longest) elongated body is the fourth elongated body 26, which is disposed internally and concentrically within the third elongated body 22. Furthermore, in such embodiments, the length of the support structure is equal to the length L2 of the second elongated body 18.

Although the support structure 10 has been exemplarily described with regard to FIGS. 11A and 11B to be configured with the second elongated body 18 being the longest, and the other elongated bodies 14, 22 and 26 having the lengths as describe above, it is envisioned that any of the elongated bodies 1-n can be the longest elongated body in any particular configuration of the support structure 10, and the remaining elongated bodies can have any order of lengths from the outermost elongated body (e.g., the first elongated body 14 as shown in FIGS. 10, 11A, 11B and 12) to the innermost elongated body (e.g., the fourth elongated body 26 as shown in FIGS. 10, 11A, 11B and 12), and remain within the scope of the present disclosure. For example, in various embodiments, the layered multi-body support structure 10 can comprise a plurality of elongated bodies concentrically disposed within each other such that there is substantially no space between adjacent bodies, wherein the plurality of elongated bodies comprises an innermost elongated body, an outermost elongated body and/or at least one intermediate elongated body disposed therebetween. Each elongated body has a proximal end and a distal and a respective length that is different that all the lengths of the other elongated bodies, and wherein the length of at least one of the at least one intermediate elongated bodies, and/or the outermost elongated body is longer than the innermost elongated body.

For example, as exemplarily illustrated in FIG. 12, the support structure 10 can comprise the first elongated body 14 having the first length L1, the second elongated body 18 having the second length L2 and disposed internally and concentrically within the first elongated body 14, the third elongated body 22 having the third length L3 and disposed internally and concentrically within the second elongated body 18, and the fourth elongated body 26 having the fourth length L4 and disposed internally and concentrically within the third elongated body 22 (and so on to the $n^{th}$ elongated body), wherein the length L3 is the longer than L1, L2 and L4 . . . $Ln^{th}$. Furthermore, in such exemplary embodiments: the length L1 can be shorter than L2 and L3, but longer L4; the length L2 can be longer than L1 and L4 but shorter than L3; and the length L4 can be shorter than L1, L2 and L3. Hence, in such exemplary embodiments the longest (e.g., the first longest) elongated body can be the third elongated body 22; the next longest (e.g., the second longest) elongated body is the second elongated body 18, which is disposed internally and concentrically within the first elongated body 14; the next longest (e.g., the third longest) elongated body is the first elongated body 14, which is disposed externally outside the second elongated body 18; and the shortest (e.g., the fourth longest) elongated body is the fourth elongated body 26, which is disposed internally and concentrically within the third elongated body 22. Furthermore, in such embodiments, the length of the support structure is equal to the length L3 of the third elongated body 22.

In various instances of such embodiments, the proximal end of each elongated body is substantially flush with the proximal ends of each of the other elongated bodies. Alternatively, the proximal ends of any one or more of the elongated bodies can extend beyond and protrude out past the proximal end of any one or more of the other elongated bodies. As described above, depending on the orientation in which the support structure 10 is disposed, the support structure 10 is fixable to the ground and/or any other structure at a proximal end portion thereof that is adjacent to and contiguous with the proximal ends of the elongated bodies. Accordingly, in such embodiments, when the support structure 10 is disposed in the vertical orientation, the proximal end 10A (i.e., the first, second, third and fourth elongated body proximal ends 14A, 18A, 22A and 26A) and/or the proximal end portion 10B (i.e., the first, second, third and fourth elongated body proximal end portions 14C, 18C, 22C and 26C) are fixable to the ground. Additionally, other structures, devices, mechanisms, apparatus, systems, such as utility components (e.g., electrical and/or communication and/or optical wires or cables), or crossbar members for supporting such utility components, can be connected to a distal end 10C of the support structure 10 (i.e., the second elongated body distal end 18B) and/or the distal end portion 10D of the support structure 10. Similarly, in such embodiments, when the support structure 10 is disposed in the horizontal orientation, the proximal end 10A (i.e., the first, second, third and fourth elongated body proximal ends 14A, 18A, 22A and 26A) and/or the proximal end portion 10B are fixable to another structure, such as an existing pole, building, tower, or another support structure 10 disposed in the vertical orientation, and other structures, devices, mechanisms, apparatus, systems, such as utility components (e.g., electrical and/or communication and/or optical wires or cables), or crossbar members for supporting such utility components, can be connected to the distal end 10C (i.e., the second elongated body distal end 18B) and/or the distal end portion 10D of the support structure 10.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A layered multi-body support structure, said support structure comprising:
   a first elongated body having a first length, a proximal end, an opposing distal end, and a proximal end portion; and
   a second elongated body having a second length that is longer than the first length, a proximal end, an opposing distal end, and a proximal end portion, the second elongated body disposed within the first elongated body such that the second elongated body is supported by the first elongated body; and a third elongated body having a third length that is longer than the first length and shorter than the second length, a proximal end, an opposing distal end, and a proximal end portion, the third elongated body disposed within the second elongated body such that the third elongated body is supported by the first and second elongated bodies, wherein the multi-body support structure is fixable to one of the ground and another structure at a proximal end portion thereof comprising the proximal end portion of the first elongated body, the proximal end portion of the second elongated body and the proximal end portion of the third elongated body.

2. The support structure of claim 1, further comprising a fourth elongated body having disposed within the third elongated body, a proximal end and an opposing distal end, a fourth length that is shorter than second length and one of:
- is longer than the first and third lengths;
- is shorter than the first and third lengths;
- is longer than the first length and shorter than third length, and
- is shorter than the first length and longer than second length such that the fourth elongated body is supported by the first, second and third elongated bodies.

3. The support structure of claim 1, wherein each of the first, second and third elongated bodies have the same cross-sectional shape.

4. The support structure of claim 1, wherein at least one of the first, second and third elongated body has different cross-sectional shape than at least one other of the first, second and third elongated bodies.

5. The support structure of claim 1, wherein the second elongated body is disposed within the first elongated body, and the third elongated body is disposed within the second elongate body such that there is substantially no gap between the first and second elongated bodies and between second and third elongated bodies.

6. A layered multi-body support structure, said support structure comprising:
- a first elongated body having a first length, a proximal end, an opposing distal end, and a proximal end portion; and
- a second elongated body having a second length, a proximal end, an opposing distal end, and a proximal end portion, the second elongated body disposed within the first elongated body such that the second elongated body is supported by the first elongated body;
- a third elongated body having a third length, a proximal end, an opposing distal end, and a proximal end portion, the third elongated body disposed within the second elongated body such that the third elongated body is supported by the first and second elongated bodies, and
- a fourth elongated body having a fourth length, a proximal end, an opposing distal end, and a proximal end portion, the fourth elongated body disposed within the third elongated body such that the fourth elongated body is supported by the first, second and third elongated bodies, wherein the third length is longer than the first, second and fourth length, wherein the multi-body support structure is fixable to one of the ground and another structure at a proximal end portion thereof comprising the proximal end portion of the first elongated body, the proximal end portion of the second elongated body, the proximal end portion of the third elongated body, and the proximal end of the fourth elongated body.

7. The support structure of claim 6, wherein fourth length that is shorter than second length and one of:
- is longer than the first and third lengths;
- is shorter than the first and second lengths;
- is longer than the first length and shorter than second length, and
- is shorter than the first length and longer than second length such that the fourth elongated body is supported by the first, second and third elongated bodies.

8. The support structure of claim 6, wherein each of the first, second and third elongated bodies have the same cross-sectional shape.

9. The support structure of claim 6, wherein at least one of the first, second and third elongated body has different cross-sectional shape than at least one other of the first, second and third elongated bodies.

10. The support structure of claim 6, wherein the second elongated body is disposed within the first elongated body, and the third elongated body is disposed within the second elongate body such that there is substantially no gap between the first and second elongated bodies and between second and third elongated bodies.

11. A layered multi-body support structure, said support structure comprising a plurality of elongated bodies concentrically disposed within each other, the plurality of elongated bodies comprising an innermost elongated body, an outermost elongated body and at least one intermediate elongated body disposed therebetween, each elongated body having a proximal end, a distal, a proximal end portion and a respective length that is different that the lengths of all the other elongated bodies, wherein the length of at least one of the at least one intermediate elongated bodies is longer than the innermost elongated body, wherein the multi-body support structure is fixable to one of the ground and another structure at a proximal end portion thereof comprising the proximal end portions of each of the plurality of elongated bodies.

12. The support structure of claim 11, wherein each of the plurality of elongated bodies has the same cross-sectional shape.

13. The support structure of claim 11, wherein at least one of the plurality of elongated bodies has different cross-sectional shape than at least one other of the first, second and third elongated bodies.

14. The support structure of claim 11, wherein the plurality of elongated bodies are concentrically disposed within each other such that there is substantially no space between adjacent elongated bodies.

* * * * *